United States Patent
Hwang et al.

(10) Patent No.: US 6,197,268 B1
(45) Date of Patent: Mar. 6, 2001

(54) REDUCTION OF TOXIC SUBSTANCES IN WASTE GAS EMISSIONS

(75) Inventors: Shuen-Cheng Hwang, Chester; Neeraj Saxena, New Providence, both of NJ (US); Mark H. Anderson, Bethlehem, PA (US); Robert James Ferrell, Rutherford, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/347,316

(22) Filed: Jul. 2, 1999

(51) Int. Cl.$^7$ .............................. C01B 21/00; C01B 21/38
(52) U.S. Cl. .................. 423/235; 423/239.1; 423/392; 423/393; 423/394.2
(58) Field of Search .................. 423/235, 239.1, 423/393, 390.1, 392, 394, 394.2

(56) References Cited

U.S. PATENT DOCUMENTS

| | | | |
|---|---|---|---|
| 4,119,703 | 10/1978 | Nishida et al. | 423/239.1 |
| 4,351,811 * | 9/1982 | Matsuda | 423/239 |
| 4,975,256 | 12/1990 | Hegedus et al. | 423/239.1 |
| 5,233,934 | 8/1993 | Krigmont et al. | 110/345 |
| 5,453,258 | 9/1995 | Lippmann et al. | 423/235 |
| 5,482,692 | 1/1996 | Audeh et al. | 423/239.2 |
| 5,589,147 | 12/1996 | Farnos et al. | 423/239.2 |
| 5,612,010 | 3/1997 | Pandey et al. | 423/239.1 |
| 5,743,929 | 4/1998 | Kapoor et al. | 65/134.6 |

FOREIGN PATENT DOCUMENTS

0532207 A1 * 3/1993 (EP) .
7-075717 * 3/1995 (JP) .

OTHER PUBLICATIONS

"Effect of Some Heterogeneous Catalysts on the Oxidation Reaction of Ammonia in Aqueous Solution by Ozonized Oxygen," S. I. Papko, Zh. Prikl. Khim, (30), 1286 (1957).

* cited by examiner

Primary Examiner—Steven P. Griffin
Assistant Examiner—Maribel Medina
(74) Attorney, Agent, or Firm—Philip H. Von Neida; Salvatore P. Pace

(57) ABSTRACT

Nitrogen oxides are removed from a waste gas stream by contacting the waste gas stream with ammonia, thereby reducing the nitrogen oxides to nitrogen. Residual nitrogen oxides and unreacted ammonia in the waste gas stream leaving the nitrogen oxides reducing step are oxidized to nitrogen pentoxide or nitric acid by contacting this gas stream with ozone. Contact of the ozone and waste gas is preferably carried out in the presence of an aqueous solution at a pH above about 9 and at a temperature above about 75° C., and this step is preferably carried out in the presence of an ammonia-oxidizing catalyst.

14 Claims, 1 Drawing Sheet

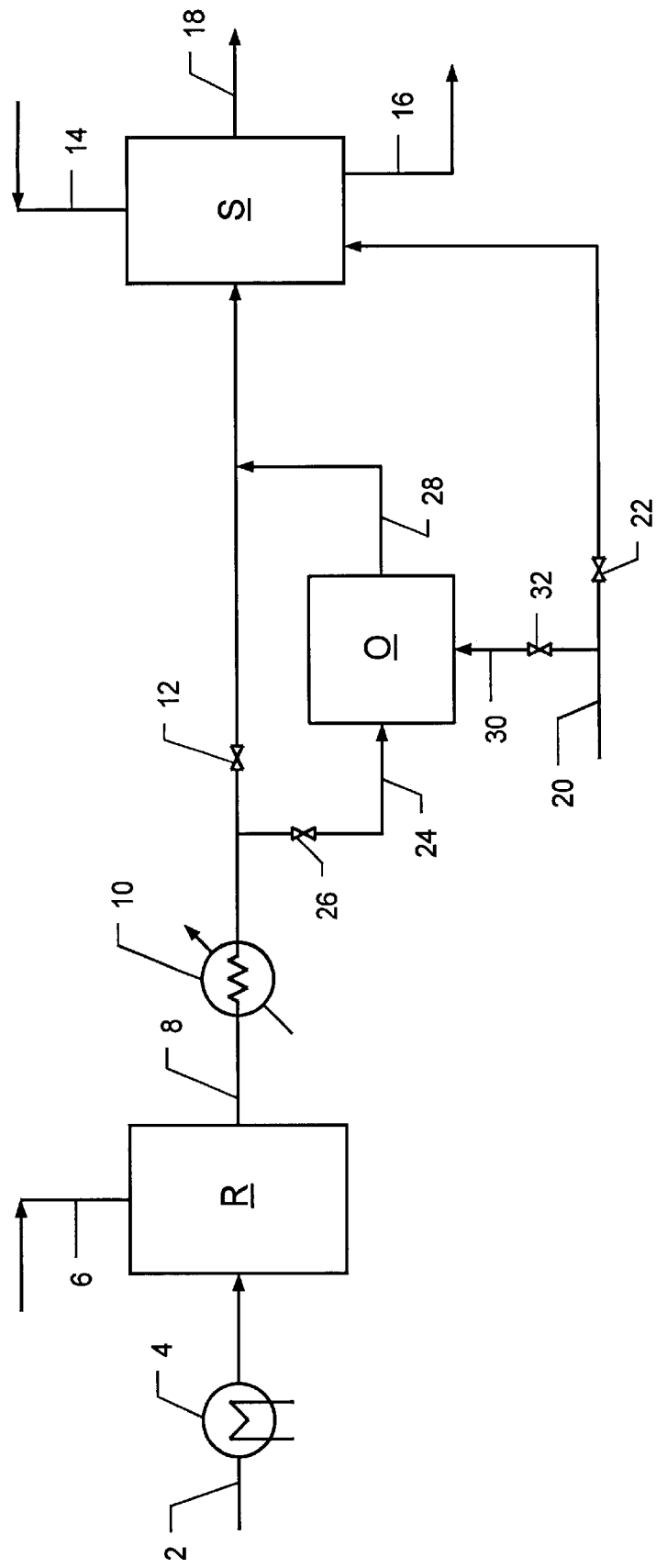

REDUCTION OF TOXIC SUBSTANCES IN WASTE GAS EMISSIONS

FIELD OF THE INVENTION

This invention relates to the removal of pollutants from gas streams, and more particularly to the reduction or elimination of nitrogen-containing pollutants from gaseous industrial plant effluents. Specifically, the invention relates to the reduction or elimination of nitrogen oxides and ammonia, from industrial waste gas streams.

BACKGROUND OF THE INVENTION

Recent federal and local environmental laws require very significant reduction of discharge of harmful gaseous impurities substances into the atmosphere. Chief among such harmful air pollutants are nitrogen oxides ($NO_x$). In response to strict enforcement efforts of these laws industrial air polluters have made considerable efforts to reduce the amount of these impurities discharged into the air in gaseous effluents from industrial or municipal sources. Successful efforts to reduce the concentration of $NO_x$ in gaseous effluents often involve reacting the $NO_x$ in waste gases with nitrogen-based reducing agents. One commercially used method of reducing $NO_x$ from gas streams involves contacting the $NO_x$ impurities with ammonia or an ammonia precursor, such as urea, in the absence of a catalytic substance, a technique known as selective non-catalytic reduction (SNCR). The ammonia reduces the $NO_x$ to nitrogen while itself being oxidized to nitrogen and water. Typical SNCR-based processes are disclosed in U.S. Pat. Nos. 5,233,934 and 5,453,258, the texts of which are incorporated herein by reference. Unfortunately, SNCR process require very high temperatures, for instance temperatures in the range of about 800 to 120° C., and even at these temperatures low conversions of $NO_x$ are achieved, For example, it is not uncommon to attain $NO_x$ reductions in the range of 40 to 50% by SNCR-based processes.

Another technique for removing $NO_x$ from waste gas streams involves contacting the waste gas with ammonia or an ammonia precursor in the presence of a substance which catalyzes the reduction of $NO_x$ to nitrogen, as in SNCR processes. These catalytic reduction processes are referred to as selective catalytic reduction (SCR). SCR processes have a few advantages over SNCR processes. They can be carried out at significantly lower temperatures than SNCR processes, for example, they are quite effective at temperatures in the range of about 250 to 600° C. Typical SCR processes are described in detail in U.S. Pat. Nos. 4,119,703, 4,975,256, 5,482,692, 5, 589,147, 5,612,010 and 5,743,929, the disclosures of which are incorporated herein by reference. Although SCR processes are much more efficient than SNCR processes in the reduction of $NO_x$ to nitrogen, they have the disadvantages of being more costly than SNCR processes, the catalyst can be poisoned or deactivated and often they do not remove all of the $NO_x$ from the gas stream being treated.

Another disadvantage of both SCR and SNCR processes is that ammonia, which itself is regarded as an environmentally unacceptable pollutant, is often released into the atmosphere in the gaseous effluent from the reactor because the reactions are often conducted in the presence of excess ammonia and/or because of sudden changes in the process that produces the $NO_x$. Ammonia may also be released because of depletion or masking of the catalyst by contamination over time.

Because of stringent environmental regulations, efforts are continuously made to improve $NO_x$ removal processes to minimize or eliminate emission of $NO_x$ and ammonia into the atmosphere. This invention provides a process which accomplishes this objective.

SUMMARY OF THE INVENTION

The invention provides a process for removing nitrogen oxides from gas streams by converting the nitrogen oxides to nitrogen by reduction with nitrogen-containing reducing agents, and residual nitrogen oxides and unreacted reducing agent are removed from the gas stream by oxidizing these components to nitric acid with ozone.

According to a broad embodiment, the invention comprises a process for removing at least one nitrogen oxide from a gas stream comprising the steps:

(a) contacting the gas stream with a nitrogen-based reducing agent at a temperature in the range of about 150 to about 1300° C., thereby converting part of the at least one nitrogen oxide to nitrogen and producing a waste gas containing residual nitrogen oxide;

(b) contacting the waste gas with ozone, thereby converting at least part of the residual nitrogen oxide to nitric acid, nitric acid precursors or mixtures thereof; and (c) contacting the nitric acid, nitric acid precursors or mixtures thereof with an aqueous medium having a pH greater than 7, thereby converting the nitric acid, nitric acid precursors or mixtures thereof to nitrate salt and scrubbing the nitrate salt from the waste gas.

In a preferred embodiment, the nitrogen-based reducing agent is ammonia, urea, melamine, cyanuric acid or mixtures thereof. In a more preferred embodiment, the nitrogen-based reducing agent is ammonia.

In another preferred embodiment, the waste gas contains unreacted nitrogen-based reducing agent and step (c) comprises contacting the waste gas with ozone and the aqueous medium at a temperature in the range of about 25° to about 125° C. in the presence of a catalyst which promotes the oxidation of the nitrogen-based reducing agent, thereby converting at least part of the unreacted nitrogen-based reducing agent to nitrate salt. Step (c) of the above process is preferably carried out at a temperature in the range of about 50 to about 100° C., and is more preferably carried out at a temperature in the range of about 75 to about 95° C.

In a preferred embodiment, the catalyst which promotes the oxidation of the nitrogen-based reducing agent comprises tungsten, palladium, platinum, iridium, rhodium or mixtures thereof.

In a more preferred embodiment, the pH of the aqueous medium with which the waste gas is contacted in step (c) is at least about 9.

In a preferred embodiment, the invention comprises a process comprising the steps:

(a) contacting a gas stream containing nitrogen oxides with ammonia at a temperature in the range of about 150 to about 1300° C., thereby converting part of the nitrogen oxides to nitrogen and producing a waste gas containing residual nitrogen oxides and ammonia;

(b) contacting the waste gas with ozone, thereby converting at least part of the residual nitrogen oxides to nitric acid, nitric acid precursors or mixtures thereof; and (c) contacting the waste gas with ozone at a temperature in the range of about 25 to about 125° C. in the presence of an aqueous medium having a pH of at least about 9 and a catalyst selected from the group consisting of tungsten, palladium, platinum, iridium, rhodium and mixtures thereof, thereby converting at least part of the ammonia and at least part of the nitric acid, nitric acid precursors or mixtures thereof to nitrate salt and scrubbing the nitrate salt from the waste gas.

In another aspect of any of the above embodiments, steps (b) and (c) are carried out simultaneously, for example in the same vessel.

Step (c) of the above preferred embodiment is preferably carried out at a temperature in the range of about 50 to about 100° C., and is more preferably carried out at a temperature in the range of about 75 to about 95° C.

In one variation of the invention, step (a) is carried out at a temperature in the range of about 600 to about 1300° C. in the absence of a catalyst which promotes the reduction of nitrogen oxides to nitrogen. In another variation, step (a) is carried out at a temperature in the range of about 150 to about 700° C. in the presence of a catalyst which promotes the reduction of nitrogen oxides to nitrogen.

In any of the embodiments of the invention, the aqueous medium with which the waste gas is contacted in step (c) preferably contains ammonium hydroxide, alkali metal hydroxides, alkaline earth metal oxides or mixtures thereof. In more preferred embodiments, the aqueous medium contains sodium hydroxide.

BRIEF DESCRIPTION OF THE DRAWINGS

The FIGURE is a schematic representation of one embodiment of a system in which the process of the invention can be practiced.

Only those valves, lines and equipment necessary for an understanding of the invention have been included in the drawings.

DETAILED DESCRIPTION OF THE INVENTION

SCR and SNCR $NO_x$ reduction processes are generally useful for the bulk removal of nitrogen oxides ($NO_x$), particularly nitric oxide and nitrogen dioxide, from gas streams, such as a chemical process waste gases or an exhaust gases from combustion operations; however, these processes are less satisfactory for reducing the concentration of $NO_x$ in gas streams to trace levels, i. e., ppm or sub-ppm levels. SCR $NO_x$ reduction processes are considerably more efficient than SNCR $NO_x$ reduction processes, however, in order to achieve efficient reduction of $NO_x$ in gas streams using SCR techniques, large quantities of expensive catalysts are often required. This invention overcomes these disadvantages by employing a multistep process for removing nitrogen oxides ($NO_x$) from gas streams: a first step comprising a $NO_x$ reduction process, and a second step comprising a $NO_x$ oxidation process.

The first step of the process, the $NO_x$ reduction step, effects the bulk reduction of $NO_x$ in a gas stream to elemental nitrogen by contacting the gas stream with one or more nitrogen-containing reducing agents, in the presence or absence of oxygen. Typical reducing agents suitable for use in the process of the invention include ammonia, urea, melamine, cyanuric acid, etc. A preferred reducing agent is ammonia. This step may be conducted either in the absence of a catalyst, e. g., SNCR, or in the presence of one or more catalysts which promote the desired reduction-oxidation (redox) reaction between the selected reducing agent and the $NO_x$, e. g., SCR. SNCR processes generally require relatively high temperatures to achieve significant $NO_x$ reduction. The temperature for SNCR processes is generally in the range of about 600 to about 1300° C., and is preferably in the range of about 800 to about 1200° C.

SCR processes are generally carried out at much lower temperatures than SNCR processes. Typically, the temperature for SCR processes is in the range of about 150 to about 700° C., and the preferred temperature range is about 250 to about 600° C. Generally transition metal catalysts, and preferably noble metal catalysts are used for $NO_x$ SCR processes. Zeolites are also useful for these processes. Suitable catalysts include vanadium, titanium, tungsten, zeolites, platinum, palladium, rhodium, ruthenium, osmium, iridium or mixtures of two or more of these. Specific details of $NO_x$ reduction processes, such as SNCR and SCR processes, are disclosed in the above-enumerated U.S. patents, and in the published literature, and such details are not a part of the invention.

The $NO_x$ reduction step can be conducted either in the presence or absence of oxygen. When ammonia is the reducing agent, the reduction-oxidation (redox) between the nitrogen oxides and ammonia is believed to proceed in accordance with reactions (1) and (2) in the presence of at least the stoichiometric amount of oxygen, and in accordance with reactions (3) and (4) in the absence of oxygen:

$$4NO+4NH_3+O_2 \rightarrow 4N_2+6H_2O \qquad (1)$$

$$2NO_2+4NH_3+O_2 \rightarrow 3N_2+6H_2O \qquad (2)$$

$$6NO+4NH_3 \rightarrow 5N_2+6H_2O \qquad (3)$$

$$6NO_2+8NH_3 \rightarrow 7N_2+12H_2O \qquad (4)$$

The second step of the process, the $NO_x$ oxidation step, is carried out using ozone as the oxidizing agent. During the course of this step residual $NO_x$ contained in the effluent from the $NO_x$ reduction step is oxidized to a higher oxidation state, typically to $N_2O_5$. The $N_2O_5$ can be scrubbed from the system as dilute nitric acid, or it can be neutralized by reaction with a base to form a harmless salt which can be safely disposed of. The $NO_x$ oxidation step is conducted at lower temperatures than the first step; accordingly, the gas exiting the first step is cooled prior to the second step of the process. Typically, the ozone oxidizing step is carried out at a temperature in the range of about 0 to 200° C., and it is preferably carried out at a temperature in the range of about 20 to about 100° C. The $NO_x$ oxidation step proceeds according to the equations:

$$NO+O_3 \rightarrow NO_2+O_2 \qquad (5)$$

$$2NO_2+O_3 \rightarrow N_2O_5+O_2 \qquad (6)$$

$$N_2O_4+O_3 \rightarrow N_2O_5+O_2 \qquad (7)$$

The $NO_x$ oxidation step is likewise known, and specific details of this step are not a part of the invention. Specific details of the $NO_x$ oxidation step are disclosed in U.S. Pat. Nos. 5,206,002 and 5,316,737, the disclosures of which are incorporated herein by reference.

As noted above, when ammonia is used as the $NO_x$ reducing agent in SCR and SNCR processes small amounts of ammonia often slip from the reactor in the treated gas stream. In the most preferred embodiment of this invention, the process includes a third step, during which ammonia is oxidized to nitric acid in accordance with the following equation:

$$NH_3+4O_3 \rightarrow HNO_3+H_2O+4O_2 \qquad (8)$$

The ammonia oxidation step is preferably carried out at a pH greater than 7, and is most preferably carried out at a pH greater than 9. The reaction is generally carried out at a temperature of at least about 25° C., is preferably carried out at a temperature of at least about 50° C., and is most preferably carried out at a temperature of at least about 75°

C. At the upper end, the reaction is generally carried out at a temperature not greater than about 125° C., is preferably carried out at a temperature not greater than about 100° C., and is most preferably carried out at a temperature not greater than about 95° C. A catalyst can be used to promote the ammonia oxidation step, if desired. Suitable ammonia oxidation catalysts include transition metals and noble metals. Catalysts suitable for use in the process of the invention include vanadium, titanium, tungsten, platinum, palladium, rhodium, ruthenium, osmium, iridium or mixtures of two or more of these Preferred catalysts include tungsten, platinum, palladium, iridium, rhodium, etc. Specific details of ammonia oxidation using ozone is disclosed in the scientific literature, for example in S. I. Papko, "Effect of Some Heterogeneous Catalysts on the Oxidation Reaction of Ammonia in Aqueous Solution by Ozonized Oxygen, Zh. Prikl. Khim, (30), 1286 (1957), the text of which is incorporated herein by reference.

The invention can be more easily understood by reference to the appended drawing. The system illustrated in the drawing includes, as major equipment units, a $NO_x$ reducing reactor, R, a scrubber and/or oxidizer unit, S and an optional $NO_x$ oxidizing reactor, O. All of these units are well known and details of their design and construction form no part of this invention.

$NO_x$ reducing reactor R can be any type of reactor that is suitable for the reaction of gaseous $NO_x$ with a nitrogen-containing $NO_x$ reducing agent. For example it can be an empty chamber or it can contain a packed bed through which the reactants are passed. Reactor R is provided with $NO_x$-containing gas feed line 2, which is equipped with heater 4, $NO_x$ reducing agent feed line 6 and reduced gas outlet line 8. Reduced gas outlet line 8 connects the outlet end of reactor R to the inlet end of unit S. Line 8 is provided with cooler 10 and valve 12.

Unit S may serve simply as a gas scrubber or as a scrubber and a $NO_x$ and/or ammonia oxidizing reactor. It is provided with caustic wash solution feed line 14, scrubbing liquid discharge line 16 and purified gas discharge line 18. Ozone feed line 20, fitted with shutoff valve 22, connects a source of ozone to unit S.

Line 24, fitted with valve 26 connects line 8, at a point between cooler 10 and valve 12, to the inlet end of optional $NO_x$ oxidizer O. Oxidized gas discharge line 28 connects the outlet end of oxidizer O to line 8 at a point downstream of valve 12, and ozone supply line 30, provided with valve 32, connects line 20, at a point upstream of valve 22, to oxidizer O. oxidizer O can be any vessel suitable for intimately mixing a waste gas with ozone. It can be, for example, a hollow vessel, or it can contain a packed bed.

Although both oxidizer O and unit S are included in the embodiment illustrated in the drawing, the system may include only one of these units, as discussed below in further detail.

In the following description, it will be assumed that the gas stream being treated in the process of the invention is a furnace flue gas containing one or more nitrogen oxides, such as nitric oxide and/or nitrogen dioxide, and that the reducing agent is gaseous ammonia.

In a first embodiment, the system in which the process is carried out includes reactor R and unit S and valves 12 and 22 are open and valves 26 and 32 are closed during operation of the process. In practicing this embodiment of the invention, the feed gas stream is introduced into the illustrated system through line 2. If the gas stream is not at the desired reaction temperature, it is heated to the appropriate temperature as it passes through heater 4, which may be any suitable heating means, such as a fuel-fired furnace or an electric heater. Optionally, the reducing agent can also be heated prior to introduction into vessel R. Additionally or alternatively, the reactor contents can be heated by internal or external heating means. As indicated above, the appropriate temperature will be in the range of about 600 to 1300° C. when reactor R is an SNCR unit and in the range of about 150 to 700° C., when the reactor is an SCR unit. The feed gas can be introduced into the system at any desired pressure, but it is preferred that it be pressurized to about 1.2 to about 3 bara (bar absolute).

As the feed gas enters reactor R, it mixes intimately with ammonia, which is introduced into reactor R at the appropriate pressure and temperature through line 6. Upon contact with the ammonia, some or all of the $NO_x$ contained in the feed gas is reduced to elemental nitrogen by the ammonia, and the ammonia is reacted to elemental nitrogen and water by the mechanism of one or more of equations (1)–(4), above. Although under ideal conditions substantially all of the $NO_x$ can be eliminated from the gas stream being treated, generally, about 50 to about 95%, and preferably about 75 to about 95% of the $NO_x$ is converted to nitrogen in reactor R.

In a first version of this embodiment, it is assumed that the effluent gas from reactor R contains residual $NO_x$ and unreacted ammonia and that unit S contains an ammonia oxidizing catalyst, for example metallic platinum or palladium mounted on an inert substrate, and a dilute aqueous solution having a pH greater than 7, and preferably at least about 9, is introduced into unit S through line 14. Suitable basic aqueous solutions include alkali metal hydroxides, such as sodium hydroxide, potassium hydroxide, etc. and alkaline earth metal hydroxides, such as calcium hydroxide, magnesium hydroxide, etc. and ammonium hydroxide. Preferably the aqueous solution contains a base having good water solubility, such as sodium hydroxide, potassium hydroxide, ammonium hydroxide, etc. A more preferred caustic solution is aqueous sodium hydroxide, which is readily available, relatively inexpensive and produces environmentally acceptable products upon reaction with the flue gas components. For purposes of discussion, it is assumed that the scrubbing solution is a dilute aqueous solution of sodium hydroxide.

The hot flue gas effluent from reactor R passes through line 8 and enters cooler 10, which can be any type of heat exchange means, such as a tube-in-shell heat exchanger with cooling water circulated through the shell side and the treated gas passing through the tubes. As the gas passes through cooler 10, it is cooled to the temperature at which the process in unit S is to be carried out, e. g., about 25 to about 125° C. It then passes through valve 12 and is introduced into unit S.

As the cooled flue gas effluent from reactor R enters unit S, it mixes intimately with the ozone-containing gas entering unit S through line 20. The ozone-containing gas can be any mixture of ozone and other gases that are compatible with the environment and which will not react with the reactor R effluent to produce undesired products. The ozone is generally generated on site by means of, for example, a high voltage corona discharge ozone electric generator using air or oxygen as the feed gas. Ozone generators are standard equipment and well known in the industry, and their design and operation form no part of this invention. Typically, the ozone containing gas comprises about 3 to about 10% by weight ozone and the balance oxygen or air components. Upon contact of the flue gas with the ozone-containing gas in unit S, some or all of the nitrogen oxides remaining in the flue gas are oxidized to nitric acid. Simultaneously, ammonia in the waste gas contacts the ozone in the presence of the catalyst, and it too is oxidized to nitric acid. The nitric acid is rapidly converted to sodium nitrate upon contact with the dilute sodium hydroxide solution. The salt-containing scrubbing solution exits reactor S through line 16 and can be disposed of or partially recirculated to reactor S, as desired. The purified flue gas, now substantially depleted of nitrogen oxides and ammonia, is discharged from the system through line 18 and discharged to the atmosphere or further processed.

In a second version of this embodiment, the gas being discharged from reactor R contains no ammonia, or it is not desired to oxidize ammonia in the gas to the nitrate. In this version, it is not necessary that unit S contain catalyst. $NO_x$ in the gas is converted to nitrate upon contact with the ozone and the alkaline scrub solution, and some or all of the ammonia is scrubbed from the gas as ammonium hydroxide. As indicated above, the scrubbed solution and purified gas leave unit S through lines 16 and 18, respectively.

In a third version of this embodiment, the gaseous effluent from reactor R contains substantially no $NO_x$. This may be the case when the ammonia being introduced into reactor R is in substantial stoichiometric excess over the amount of $NO_x$ in the gas stream entering reactor R. In this version, reactor S contains a suitable ammonia oxidation catalyst and the gas stream is introduced into unit S at a suitable temperature, preferably at least 75° C., as stated above. The ammonia is oxidized to nitrate upon contact with the ozone and alkaline aqueous scrub solution entering unit S through lines 20 and 14, respectively. As before, the scrub solution and purified gas leave unit S through lines 16 and 18, respectively.

In a second embodiment of the invention, the system includes reactor R, unit S and $NO_x$ oxidizer O, and the gas exiting reactor R contains residual $NO_x$ and unreacted ammonia. This embodiment is useful when it is desired to convert some or all of the $NO_x$ in the gas to $N_2O_5$ or gaseous nitric acid prior to oxidizing ammonia to nitrate in unit S. In this embodiment valves 22, 26 and 32 are open and valve 12 is closed. The hot gas exits reactor R through line 8, is cooled to the desired unit S ammonia oxidation temperature (at least about 25° C., and preferably about 75° C.), and introduced into oxidizer O. In oxidizer O the waste gas contacts ozone being introduced into this unit through line 30, and $NO_x$ in the waste gas is converted to $N_2O_5$ (or gaseous nitric acid, if sufficient moisture is present in the gas stream). The treated gas exits oxidizer O through line 28 and enters unit S through line 8. Upon entering unit S, ammonia in the gas contacts ozone and alkaline aqueous solution, introduced into unit S through lines 20 and 14, respectively, and the ammonia is rapidly converted to nitrate, as described above. The scrub solution and purified gas leave unit S through lines 16 and 18, respectively.

In a variation of the second embodiment, the waste gas contains no ammonia, or it is not desired to convert any ammonia in the gas to nitrate. In this case unit S serves only as a scrubber and it contains no catalyst. Valves 26 and 32 are opened and valve 12 is closed. Valve 22 may be open or closed, as desired. In this variation, the waste gas enters oxidizer O through line 24 and some or all of the $NO_x$ contained in the waste gas is converted to $N_2O_5$ or gaseous nitric acid in oxidizer O. The treated gas exits oxidizer O through line 28 and enters scrubber S, wherein it is neutralized to nitrate. If valve 22 is open, residual $NO_x$ remaining in the gas stream is converted to nitrate upon contact with ozone entering this unit through line 20 and scrubbing solution entering the unit through line 14. This embodiment is useful when the gas contains significant quantities of $NO_x$.

It will be appreciated that it is within the scope of the present invention to utilize conventional equipment to monitor stream concentrations and automatically regulate the flow of the various process streams within the system so that the system can be fully automated to run continuously in an efficient manner.

Although the invention has been described with particular reference to specific equipment arrangements and to a specific experiment, these features are merely exemplary of the invention and variations are contemplated. The scope of the invention is limited only by the breadth of the appended claims.

What is claimed is:

1. A process for removing at least one nitrogen oxide from a gas stream comprising the steps:
   (a) contacting said gas stream with a nitrogen-based reducing agent at a temperature in the range of about 150 to about 1300° C., thereby converting part of said at least one nitrogen oxide to nitrogen and producing a waste gas containing residual nitrogen oxide;
   (b) contacting said waste gas with ozone, thereby converting at least part of said residual nitrogen oxide to nitric acid, nitric acid precursors or mixtures thereof; and
   (c) simultaneously along with step (b), contacting said nitric acid, nitric acid precursors or mixtures thereof with an aqueous medium having a pH greater than 7 and at a temperature in the range of about 25° to about 125° C. in the presence of a catalyst thereby converting said nitric acid, nitric acid precursors or mixtures thereof to nit e salt and scrubbing said nitrate salt from said waste gas.

2. The process of claim 1, wherein said nitrogen-based reducing agent is selected from the group consisting of ammonia, urea, melamine, cyanuric acid and mixtures thereof.

3. The process of claim 1, wherein said nitrogen-based reducing agent comprises ammonia.

4. The process of claim 3, wherein step (c) is carried out at a temperature in the range of about 50 to about 100° C.

5. The process of claim 4, wherein said catalyst comprises tungsten, palladium, platinum, iridium, rhodium or mixtures thereof.

6. The process of claim 5, wherein the pH of said aqueous medium is at least about 9.

7. The process of claim 6, wherein step (c) is carried out at a temperature in the range of about 75 to about 95° C.

8. A process comprising the steps:
   (a) contacting a gas stream containing nitrogen oxides with ammonia at a temperature in the range of about 150 to about 1300° C., thereby converting part of said nitrogen oxides to nitrogen and producing a waste gas containing residual nitrogen oxides and ammonia;
   (b) contacting said waste gas with ozone, thereby converting at least part of said residual nitrogen oxides to nitric acid, nitric acid precursors or mixtures thereof; and
   (c) contacting said waste gas with ozone at a temperature in the range of about 25 to about 100° C. in the presence of an aqueous medium having a pH of at least about 9 and a catalyst selected from the group consisting of tungsten, palladium, platinum, iridium, rhodium and mixtures thereof, thereby converting at least part of said ammonia and at least part of said nitric acid, nitric acid precursors or mixtures thereof to nitrate salt and scrubbing said nitrate salt from said waste gas.

9. The process of claim 8, wherein steps (b) and (c) are carried out simultaneously.

10. The process of claim 1, claim 8 or claim 9, wherein step (c) is carried out at a temperature in the range of about 75 to about 95° C.

11. The process of claim 1, claim 8 or claim 9, wherein step (a) is carried out at a temperature in the range of about 600 to about 1300° C. in the absence of a catalyst which promotes the reduction of nitrogen oxides to nitrogen.

12. The process of claim 1, claim 8 or claim 9, wherein step (a) is carried out at a temperature in the range of about 150 to about 700° C. in the presence of a catalyst which promotes the reduction of nitrogen oxides to nitrogen.

13. The process of claim 1, claim 8 or claim 9 wherein said aqueous medium contains a base selected from the group consisting of ammonium hydroxide, alkali metal hydroxides, alkaline earth metal oxides and mixtures thereof.

14. The process of claim 13, wherein said aqueous medium contains sodium hydroxide.

* * * * *